(12) United States Patent
Yang et al.

(10) Patent No.: US 8,451,777 B2
(45) Date of Patent: May 28, 2013

(54) TECHNIQUES TO ASSIGN MULTIPLE IDENTIFIERS IN A WIRELESS NETWORK

(75) Inventors: Xiangying Yang, Hillsboro, OR (US); Muthaiah Venkatachalam, Beaverton, OR (US); Avishay Sharaga, Beit Nehemya (IL); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 12/851,841

(22) Filed: Aug. 6, 2010

(65) Prior Publication Data

US 2011/0199967 A1 Aug. 18, 2011

Related U.S. Application Data

(60) Provisional application No. 61/291,787, filed on Dec. 31, 2009.

(51) Int. Cl.
*H04Q 7/00* (2006.01)
*H04L 12/28* (2006.01)

(52) U.S. Cl.
USPC .......................................... 370/328; 370/401

(58) Field of Classification Search
USPC ................... 370/252, 254, 255, 328, 338, 401
See application file for complete search history.

(56) References Cited

U.S. PATENT DOCUMENTS

| | | | | |
|---|---|---|---|---|
| 7,986,677 B2* | 7/2011 | Park et al. | | 370/338 |
| 2007/0036097 A1* | 2/2007 | Costa et al. | | 370/318 |
| 2007/0286120 A1* | 12/2007 | Dang | | 370/328 |
| 2007/0298725 A1 | 12/2007 | Ryu | | |
| 2009/0124260 A1 | 5/2009 | Casati et al. | | |
| 2009/0280812 A1 | 11/2009 | Cheng et al. | | |
| 2010/0056141 A1 | 3/2010 | Marsan et al. | | |
| 2010/0273483 A1 | 10/2010 | Cho et al. | | |
| 2011/0044307 A1 | 2/2011 | Mohanty et al. | | |

FOREIGN PATENT DOCUMENTS

| | | |
|---|---|---|
| WO | 2011/028538 A2 | 3/2011 |
| WO | 2011/028538 A3 | 6/2011 |

OTHER PUBLICATIONS

"Section 16.2.1.2.4 Context Retention Identifier (CRID)", Part 16: Air Interface for Fixed and Mobile Broadband Wireless Access Systems, IEEE P802.16m/D5, Apr. 7, 2010, pp. 45.
"Section 16.2.1.2.3 Deregistration Identifier (DID)", Part 16: Air Interface for Broadband Wireless Access Systems, IEEE P802.16m/D10, Nov. 24, 2010, pp. 60.
"Part 16: Air Interface for Fixed and Mobile Broadband Wireless Access Systems", Advanced Air Interface, IEEE P802.16m/D3, Dec. 8, 2009, 676 pages.
International Search Report and Written Opinion received for PCT Patent Application No. PCT/US2010/046518, mailed on Apr. 29, 2011, 9 pages.
Soulhi, Said, "3G Wireless Networks Provisioning and Monitoring via Policy Based Management", Proceedings of ICCT 2003, pp. 1137-1143.
Office Action received in U.S. Appl. No. 12/839,619, mailed Oct. 12, 2012, 17 pages.
Office Action received in U.S. Appl. No. 12/839,619, mailed Feb. 7, 2013, 21 pages.

* cited by examiner

*Primary Examiner* — Hong Cho
(74) *Attorney, Agent, or Firm* — Glen B Choi

(57) ABSTRACT

Techniques are described that can be used to assign identifiers to mobile stations in a Network Access Provider (NAP) domain and a paging identifier. In some cases, the NAP identifier and paging identifier can be unique in the NAP domain and the paging group domain. The paging identifier can be derived from a NAP identifier.

24 Claims, 7 Drawing Sheets

TECHNIQUES TO ASSIGN MULTIPLE IDENTIFIERS IN A WIRELESS NETWORK

RELATED APPLICATIONS

This application claims the benefit of U.S. Provisional Application No. 61/291,787, filed Dec. 31, 2009. This application is also related to U.S. patent application Ser. No. 12/839,619, entitled "Deregistration with Context Retention," inventors Mohanty et al., filed Jul. 20, 2010.

FIELD

The subject matter disclosed herein relates generally to techniques to assign identifiers to mobile stations in a wireless network.

RELATED ART

In IEEE 802.16e compliant networks, a mobile station (MS) identifies itself by providing its actual media access control (MAC) address to a base station (BS). For example, the MS may provide its MAC address to connect to a network when entering a network or when resuming operation after being idle. The MS's 48 bit MAC address can be used as a Network Access Provider (NAP) identifier for the mobile station. The paging ID for the MS can be derived from a cyclic redundancy check (CRC) hashed MAC address and truncated to 24 bits. However, exposing the actual MAC address raises concerns because theft of the MAC address may take place. Another device can use the MAC address and pretend to be that MS. In addition, this exposure of MS MAC address causes concerns of user identity theft and loss of user location privacy.

IEEE 802.16m draft 5 (2010) describes enhanced MS privacy requirements such that the MS's MAC address is not to be transmitted over a wireless network without encryption. On the other hand, for advanced features such as seamless mobility operations, power saving, and so forth, network entities such as a paging controller, Access Service Networks (ASN) gateway, and authenticator use some form of MS identifier to locate and store MS-related static context. Therefore, a new ID addressing framework is desired to support enhanced features without compromising privacy of the MS. In addition, IEEE 802.16m backward compatibility is desirable so that an IEEE 802.16m BS can handle legacy network operations using devices in an IEEE 802.16e compatible network.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
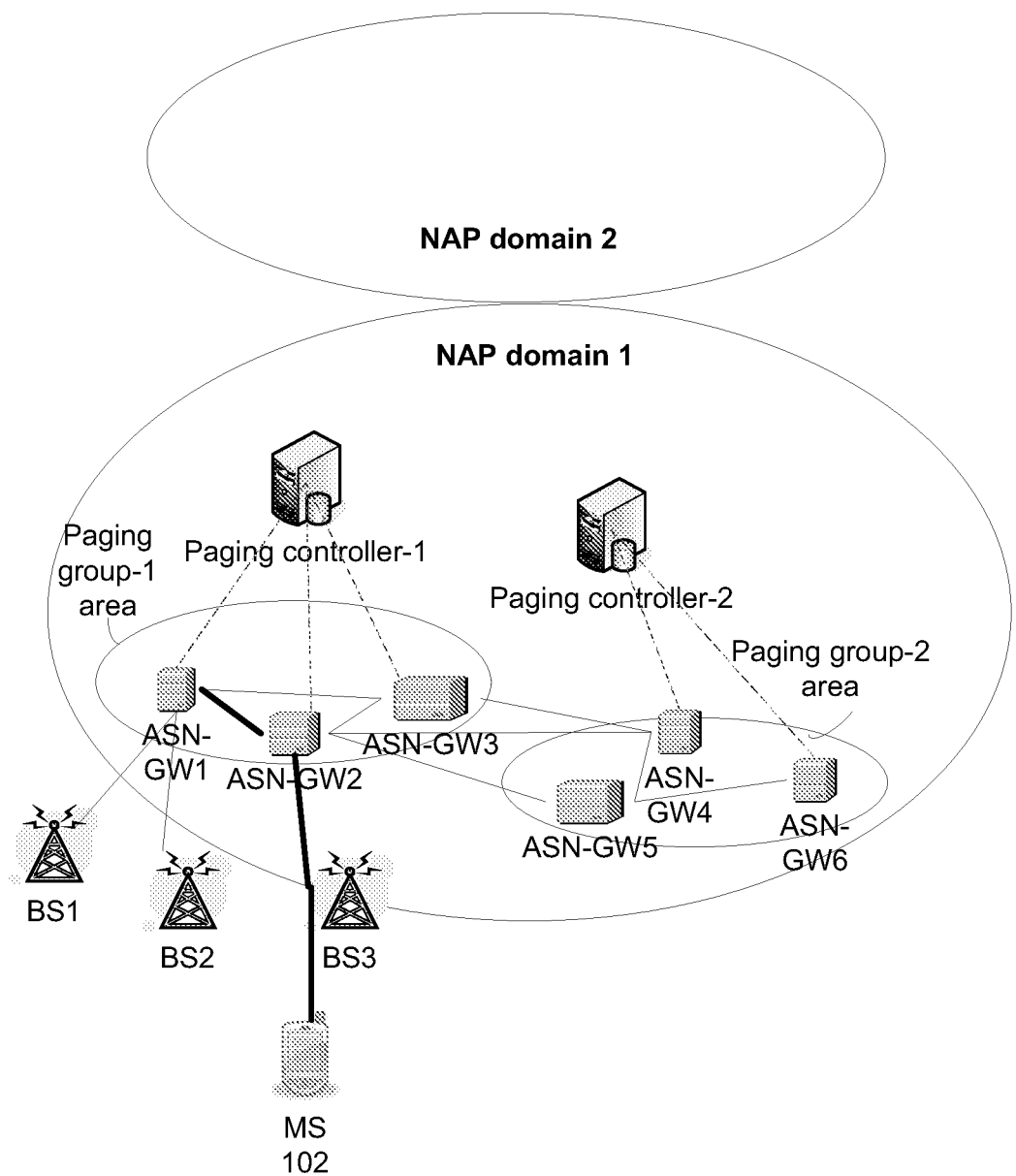
FIG. 1 depicts an example of a network in which a mobile station operates.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to IEEE 802.11a, 802.11b, 802.11e, 802.11g, 802.11h, 802.11i, and 802.11n as well as any version or draft of IEEE 802.16e and IEEE 802.16m.

Various embodiments provide techniques for assigning Network Access Provider (NAP) identifiers and paging identifiers to a mobile station. The NAP identifier and paging identifier can be chosen to be unique in the respective NAP and paging group domains. In some cases, the paging controller and mobile station derive the paging identifier of the mobile station from the NAP identifier. If the derived paging identifier is not unique in the paging group domain of the mobile station, then another NAP identifier can be assigned to the mobile station so that the mobile station's derived paging identifier is unique in the paging group domain. In some cases, a function is used to derive the paging identifier from the NAP identifier.

A NAP-MSID can be a NAP identifier for a mobile station and can be unique in the current NAP domain of the mobile station. A NAP-MSID can be unique to a MS but a single NAP domain can have multiple assignable NAP-MSIDs. A paging MSID can be an identifier for a mobile station in a paging group and the identifier is potentially unique in the current paging group of the mobile station. Mobile stations sharing a paging ID is permissible. A paging ID can be used when a network is to reach a MS.

A NAP-MSID domain may be much larger than that of a paging MSID. For example, an NAP-MSID can be 32 or 48 bits and the paging ID can be correspondingly 16 or 24 bits, although other sizes can be used.

Various embodiments provide a unique NAP-MSID to an MS so that the network can look up an MS's context to prepare for a network re-entry of a MS. For example, various embodiments can be used in a case of coverage loss recovery as well as uncontrolled hand over (HO). The network may look up an MS context to prepare for procedures such as inbound inter-RAT HO and network re-entry from Deregistration with Content Retention (DCR). Techniques for MS context look-up are described in U.S. patent application Ser. No. 12/839,619, entitled "Deregistration with Context Retention," inventors Mohanty et al., filed Jul. 20, 2010.

In one embodiment, the context and the MS are associated with a context retention identifier (GRID). The context can include security keys, service flow parameters, capability parameters, and quality of service (QoS) parameters associated with connections established by the mobile station. The context can also include a paging MS identifier. The context can be communicated in the format of an information element.

FIG. 1 depicts an example of a network in which a mobile station operates. Each of paging controller-1 and paging controller-2 manages one or more paging group areas. In this example, a mobile station (MS) 102 is associated with NAP domain 1 and paging group-1. An Access Service Network (ASN) gateway assigns a NAP identifier to MS 102. Paging controller-1 manages the paging ID of mobile station 102 in paging group-1. A paging group can encompass a geographic area such as coverage by a certain number of base stations. ASN-GW1 can maintain the MS context and service, regardless of potential mobility of MS. For example, MS's control can be "anchored" at ASN-GW1 and the MS can connect through base station BS3 to ASN-GW2 so that ASN-GW2 provides a relay point for ASN-GW1. Mobile station 102 can potentially move to another NAP domain, such as NAP domain 2. In addition, mobile station 102 can potentially move to another paging group, such as paging group-2.

ASN-GW1 assigns a unique NAP-MSID to MS 102 in NAP domain 1 and the same NAP-MSID is retained in the NAP domain 1. ASN-GW1 can assign a NAP-MSID to MS 102 during the initial network entry of MS 102. When MS 102 enters another NAP domain, a NAP central controller independently assigns a NAP-MSID to MS 102 for the other NAP domain. A NAP central controller can be formed by one or more ASN-GWs.

ASN-GW can assign a new NAP ID at will, regardless of whether the MS enters a new NAP domain. For example, an ASN-GW can assign another serving gateway to an MS, i.e., switch the anchor ASN-GW for this MS, which causes assignment of a new NAP ID if the NAP ID format contains information related to the serving gateway. In another case, the NAP ID may have a certain lifetime and the network refreshes the NAP ID after certain time expires. In yet another example, described later, following MS mobility, the network may update the NAP ID so that other associated ID derived from NAP ID meets network requirements.

The NAP-MSID can be determined in a variety of manners. The NAP-MSID can be a random number. In some cases, during the assignment of the NAP-MSID to a MS, the ASN-gateway IP address that assigned this ID may also be given to the MS. In some cases, the NAP-MSID includes some form of the ASN-gateway addressing, such as its IP address. For example, the NAP-MSID can be 48 bits and inside the 48 bits, 32 bits can be used for the ASN-gateway IP address. In some cases, the NAP-MSID can be 24 bits whereas the paging ID can be 10 bits, although other numbers of bits can be used. Other sizes of NAP-MSID values and form of ASN-GW addressing can be used.

If the IP address of the ASN-gateway that assigned a NAP ID is provided to MS 102 with the provision of the NAP ID, MS 102 can provide its NAP-MSID to a BS when entering a different NAP domain, exiting from coverage loss, or exiting De-registration with Context Retention (DCR) mode or some other possible handover cases. The BS informs the ASN-gateway that the NAP-MSID is to be surrendered. The ASN-gateway performs network operations to activate a proper context for the MS in the network and allow the BS to admit the MS to the network quickly so that all the parameters associated with the context will not be re-negotiated between MS and BS/network. The context could be transferred from an old ASN to a new ASN if the anchor is to be relocated in the network. The anchor could be the same ASN when there is no anchor change. Such network operation is transparent to the MS. This procedure for surrendering NAP-MSID may provide rapid context retrieval for the MS and assignment of another NAP-MSID.

If the ASN-gateway IP address is not provided or available to the BS or that ASN-GW is not easily reachable by the BS and current NAP/ASN-GW, then a new NAP-MSID assignment process may take place, which can take more time than if the ASN-gateway IP address is provided and valid because the network has to determine where to retrieve the MS context. Providing an IP address of the ASN gateway may reduce the time to assign NAP-MSID because the serving gateway can be identified using the provided IP address without searching for the serving gateway by polling or broadcast operations.

Figure 2:
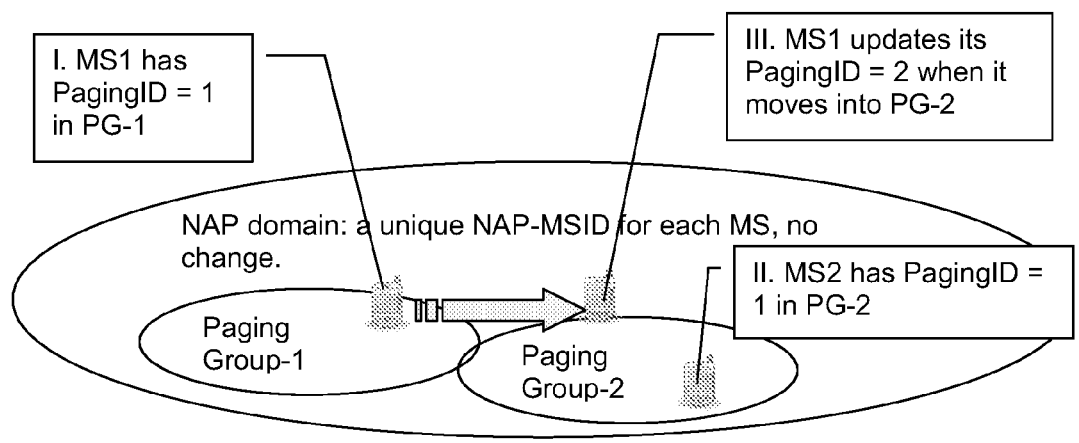
FIG. 2 depicts an example of assignment of NAP-MSID and paging MSID to a mobile station.

FIG. 2 depicts an example of assignment of a NAP-MSID and paging MSID to a mobile station. The MS can remain in a single NAP domain while moving from a first paging group to a second paging group. When the MS moves to the second paging group, MS performs location update with the second paging controller and the MS may be assigned a different paging MS identifier in the second paging group. The paging controller associated with the second paging group can assign a paging MSID to the MS. Each paging group has at least one paging controller.

A paging controller can potentially update a paging identifier of an MS in at least several situations: (1) the MS enters idle mode, (2) the MS exits idle mode and enters connected mode, and (3) periodically when the MS is in idle mode. Idle mode can be when the MS does not have an active transmission or receipt of data to or from its network. For example, during idle mode, the MS might not be involved in voice or data communications with the network. Connected mode can be when the MS is involved in voice or data communications with the network. During connected mode, when the MS moves to another paging group, the BS can hand-off the MS to another BS in the new paging group so that paging identifiers can be potentially updated. For an MS in idle mode, the MS's responsibility is to monitor the current Paging Group area (identified by corresponding Paging group ID), and if there is a change from its current Paging group ID, the MS performs a location update to obtain a Paging MSID associated with the new paging area.

In an embodiment, the NAP-MSID and paging ID can be independent values. In another embodiment, both the MS and the paging controller can derive the paging ID from the NAP-MSID. In this case, the paging controller and the MS can merely maintain the root ID, namely the NAP-MSID. A hash or concatenation operation can be performed to derive the paging ID from the NAP-MSID. A derivation operation that randomly and/or uniformly maps a paging ID onto the paging ID space can be used.

The ASN gateway informs the paging controller to derive a paging ID and can also indicate which derivation operation to use. Using in or out-of-band messaging, the ASN gateway can inform the paging controller and the BS can inform the MS which derivation operation to use to determine the paging ID. In some cases, a derivation operation is pre-provisioned in both network and MS so that no additional signaling is needed.

In another case, the paging ID can be a truncation of the NAP-MSID. For example, several of the leading bits of the NAP-MSID can be truncated and additional concatenation of other related information such as some form of addressing related to the current paging controller can take place.

In another case, the paging ID can be derived at least from a serving BSID, anchor ASN ID, and/or Paging Controller ID. For example, the paging ID can be determined from the function: Paging ID=F(NAP–MSID, ASN ID, Paging Controller ID, serving BSID).

While performing the NAP-MSID assignment, uniqueness of the paging MSID in the current paging group domain may be desirable to minimize collision given the current joint assignment status. A collision occurs if two or more MS have the same paging ID. In such case, a communication intended for a particular MS may also cause another MS to wake up to respond to the communication. Collisions may unnecessarily wake up an MS.

Figure 3:
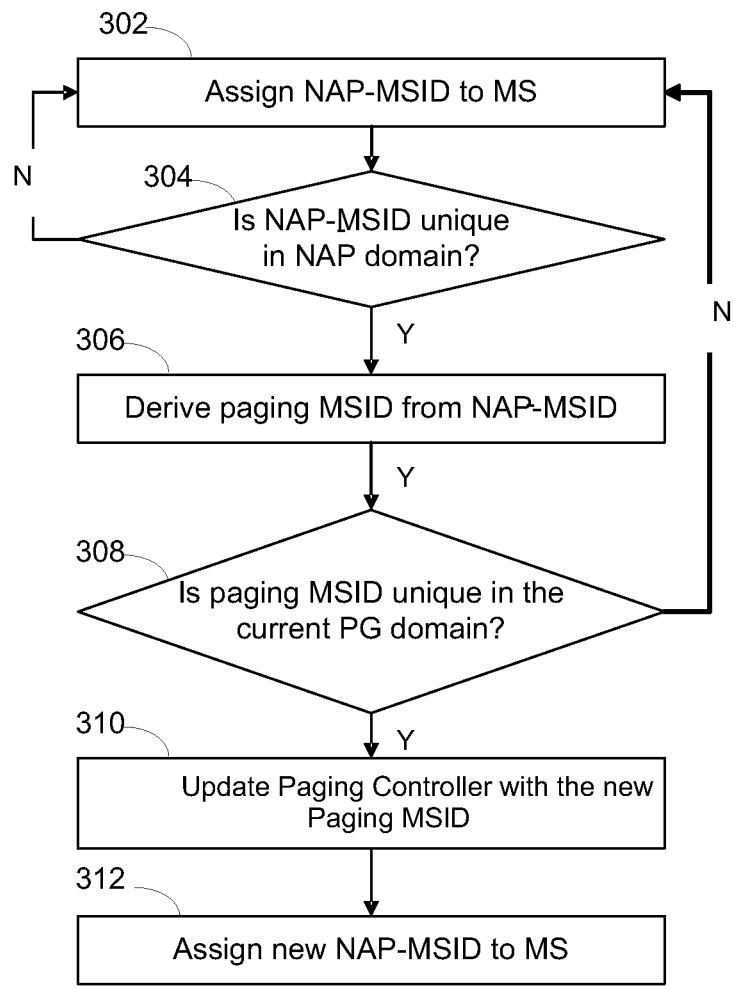
FIG. 3 depicts an example process to assign a NAP-MSID and paging MSID to a mobile station to attempt to achieve uniqueness in both NAP and paging group domains.

If the paging ID is derived from the NAP-MSID, the paging ID might not be unique in a paging group. Even if the network performed an initial assignment that provided uniqueness in both NAP and paging group domains, this uniqueness may be lost after an MS changes its paging group. FIG. 3 depicts an example process to assign an NAP-MSID and paging MSID to a mobile station to attempt to achieve uniqueness of identifiers in both NAP and paging group domains. The process of FIG. 3 can take place when an MS is assigned a paging MSID (such as during initial network entry) or moves to a new paging group.

Block 302 includes an ASN gateway assigning an NAP-MSID to an MS. Block 304 includes the ASN gateway determining whether the assigned NAP-MSID is unique in the NAP domain. If the assigned NAP-MSID is not unique in the NAP domain, block 302 follows block 304 so that another NAP-MSID is assigned to the MS. In some cases block 304 repeats but at a later time to check if the NAP-MSID is unique due to changes in NAP-MSID assignments. If the assigned NAP-MSID is unique in the NAP domain, block 306 follows block 304.

Block 306 includes the ASN gateway determining a paging MSID based on the NAP-MSID. For example, the paging MSID can be derived from the NAP-MSID using a concatenation, equation, hash, or other mathematical techniques.

Block 308 includes the ASN gateway communicating with paging controllers to determine whether the paging MSID is unique in the current paging group (PG) domain of the MS. Block 308 can also check whether two or more mobile stations are currently sharing this paging MSID. If the assigned paging MSID is not shared by mobile stations in the current PG domain, then block 310 follows block 308. If the assigned paging MSID is shared by mobile stations in the current paging group (PG) domain, then block 302 follows block 308 in order to assign another NAP-MSID to the MS. In some cases, instead of assigning another NAP-MSID to the MS, the derivation operation can be changed so that a unique paging MSID results in the current PG domain. In some cases, if the paging MSID is not unique in the current PG domain, instead of block 302 following block 308, block 308 repeats at a later time in case conditions in the network have changed.

In some cases, in the event sharing of a paging MSID by multiple mobile stations is allowed, another paging identifier can be determined that is not unique but used by a smaller number of mobile stations in the current paging group domain of the mobile station to mitigate possible collision problems.

Block 310 includes the paging controller updating the paging MSID for the mobile station with the assigned paging MSID.

Block 312 includes the ASN gateway transmitting the new NAP-MSID to the MS. The new NAP-MSID can be determined from block 302. The ASN gateway informs the paging controller and mobile station which derivation operation to perform to determine the paging MSID. The paging controller and MS determine the paging MSID by deriving the paging MSID from the NAP-MSID. The context associated with the MS can also be updated to include the new NAP-MSID and paging MSID.

In the event that the same paging ID is assigned to more than one MS, one option is to permit collision. A collision causes another MS with the same paging ID to wake-up unintentionally. A collision based on the paging ID will not break a paging operation. If the network is relatively lightly loaded, the paging ID length hopefully can ensure this kind of collision happens with very small probability. The longer the ID length, the more IDs are available for use and the lower the probability of collision.

In some cases, in response to the paging identifier already being used by multiple mobile stations in the paging domain of the mobile station, the ASN gateway identifies another NAP domain identifier to the mobile station that is not unique in the NAP domain of the mobile station but only used by a small number of mobile stations in the NAP domain of the mobile station to mitigate the possible collision problem although it does not fully avoid it.

Figure 4:
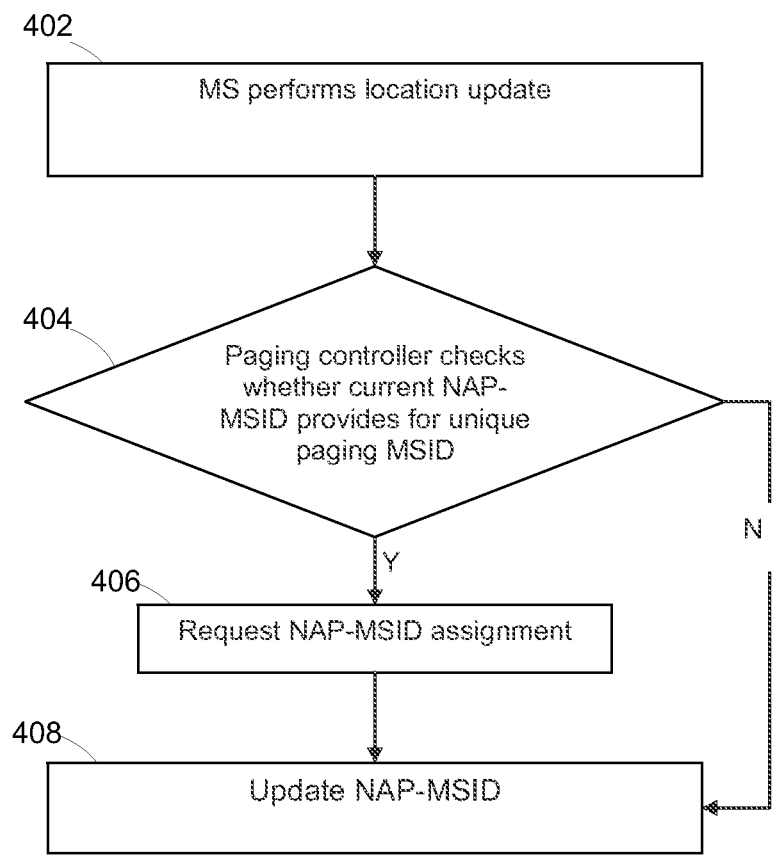
FIG. 4 depicts a process for attempting to achieve paging MSID uniqueness in the paging group domain.

Some embodiments attempt to provide a strong guarantee of paging ID uniqueness in the paging group domain. Because paging ID is derived from the NAP-MSID, the network can attempt to ensure paging ID uniqueness in the current paging group domain when negotiating a new NAP-MSID. FIG. 4 depicts a process for attempting to achieve paging MSID uniqueness in the paging group domain. Using the process of FIG. 4, when the MS performs a location update in a new paging group and the paging controller realizes the new paging MSID is not unique in the current paging group domain, the paging controller can assign an NAP-ID to the MS with an additional uniqueness guarantee on the paging MSID.

Block 402 includes the MS performing a location update. The location update can take place when the MS moves from one paging group to another paging group. Block 402 can include the MS transmitting its assigned NAP-MSID to a network.

In the case of an MS re-entering a network from idle mode, instead of the mobile station transmitting an NAP MSID to the network, mobile station can transmit the paging MS ID to the network if the uniqueness is known to be guaranteed in the paging group domain. Transmission of the paging MS ID can use less bandwidth than transmission of the NAP ID.

Block 404 includes the paging controller checking whether the current NAP-MSID of the MS is to be changed to ensure paging MSID uniqueness in the new paging group. A paging controller can derive the paging MSID from the NAP-MSID and determine whether the paging MSID is unique. Block 404 can also check whether there are too many mobile stations currently sharing this paging MSID. If the paging MSID of the MS is assigned to more than one MS, then block 406 follows block 404. If the paging MSID of the MS is assigned to one MS, then block 408 follows block 404.

Block 406 includes the ASN gateway requesting NAP-MSID assignment to the MS. For example, a process described with regard to FIG. 3 can be used for NAP-MSID assignment.

Block 408 includes the ASN gateway updating the NAP-MSID of the MS using the NAP-MSID assigned to the MS prior to location update or assigned in block 406.

Various embodiments permit legacy IEEE 802.16e network support for mobile stations using a core network (e.g., network components except for the BSs). In IEEE 802.16e compatible networks, mobile stations are paged using a paging message and are identified using their 24 bit MAC address hash. This hash can be derived by performing a CRC 24 on their respective 48 bt MAC addresses. To support legacy network, different IEEE 802.16m features such as idle mode work use the legacy network entities such as Paging Controller and ASN Gateway. To support legacy mode operation for an IEEE 802.16m MS, a paging group ID can be: (1) the paging group ID that is described above or (2) the 24 bit MAC address hash as described in IEEE 802.16e standard (e.g., IEEE 802.16e-2005 and 16e-2009) that is derived by performing CRC 24 on a 48 bit MAC address of a mobile station. In IEEE 802.16e-2009, a 24 bit MAC address hash is described in MOB_PAG-ADV message, Table 154. The 24 bit MAC ID hash can also be derived from the NAP-MSID using a special operation. This special operation can be only known to the base stations that broadcast the paging message. Therefore, the MAC ID hash derivation can be transparent to the network as required in the legacy operation.

Figure 5:
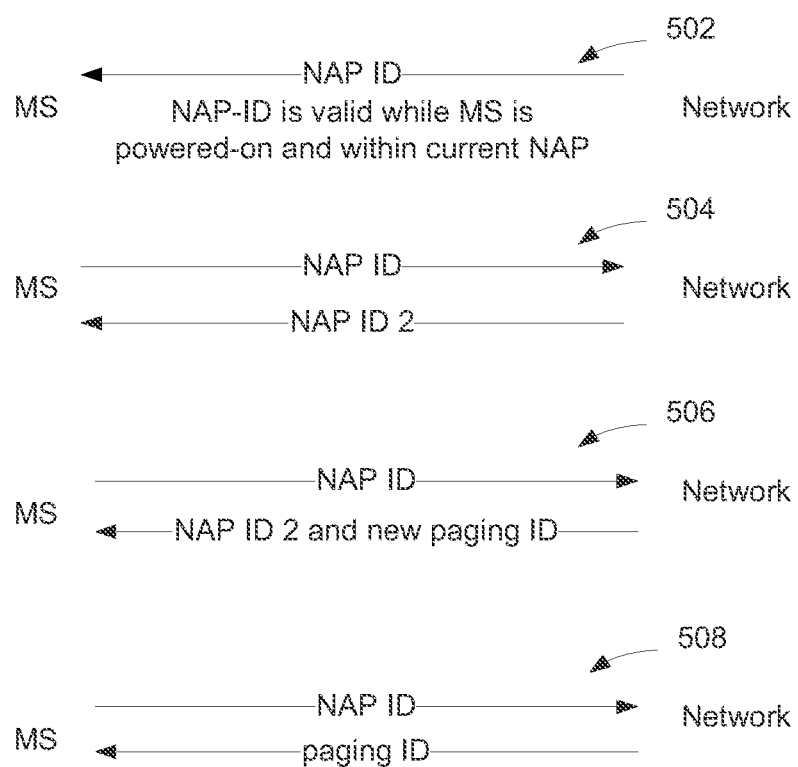
FIG. 5 depicts an example of information exchange between an MS and a network.

FIG. 5 depicts an example of information exchange between an MS and a network. In 502, a network assigns a NAP ID to a mobile station (MS). The NAP ID is valid while the MS is powered-on and within the current NAP.

In 504, during a periodic check-in with a network or a return to connected mode, the MS transmits its NAP ID to a network. The network responds by providing another NAP ID, NAP ID2. The MS can derive paging ID from NAP ID2.

In 506, during a periodic check-in with a network or a return to connected mode, the MS transmits its NAP ID to the network and the network provides a new NAP ID, NAP ID2, as well as a new paging ID. The new paging ID can be independent from the NAP ID2.

In 508, during a periodic check-in with a network or a return to connected mode, the MS transmits its NAP ID to the network. The network determines that the MS has moved to another paging group. The network assigns another paging ID to the MS for the new paging group.

Figure 6:
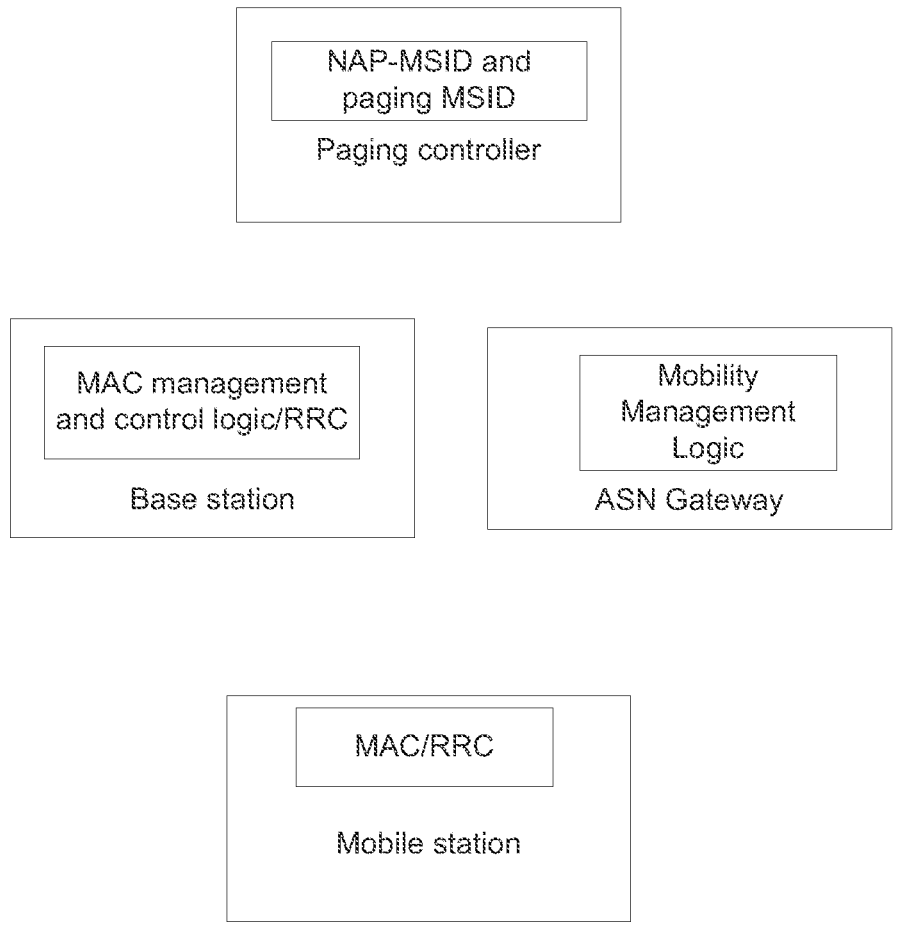
FIG. 6 depicts an example of logic in components that permit assignment and use of NAP-ID and paging IDs in accordance with embodiments described herein.

FIG. 6 depicts an example of logic in components that permit assignment and use of NAP-ID and paging IDs in accordance with embodiments described herein. The paging controller stores NAP-MSID and paging MSID for each MS. The ASN gateway includes mobility management logic to manage the NAP-MSID and paging MS ID assignment in accordance with embodiments described herein. Base station includes MAC management and control logic/radio resource control (RRC) logic for use at least in managing NAP-MSID and paging MS ID assignment in accordance with embodiments described herein. Similarly, mobile station includes MAC/RRC for use at least in managing NAP-MSID and paging MS ID assignment in accordance with embodiments described herein.

Figure 7:
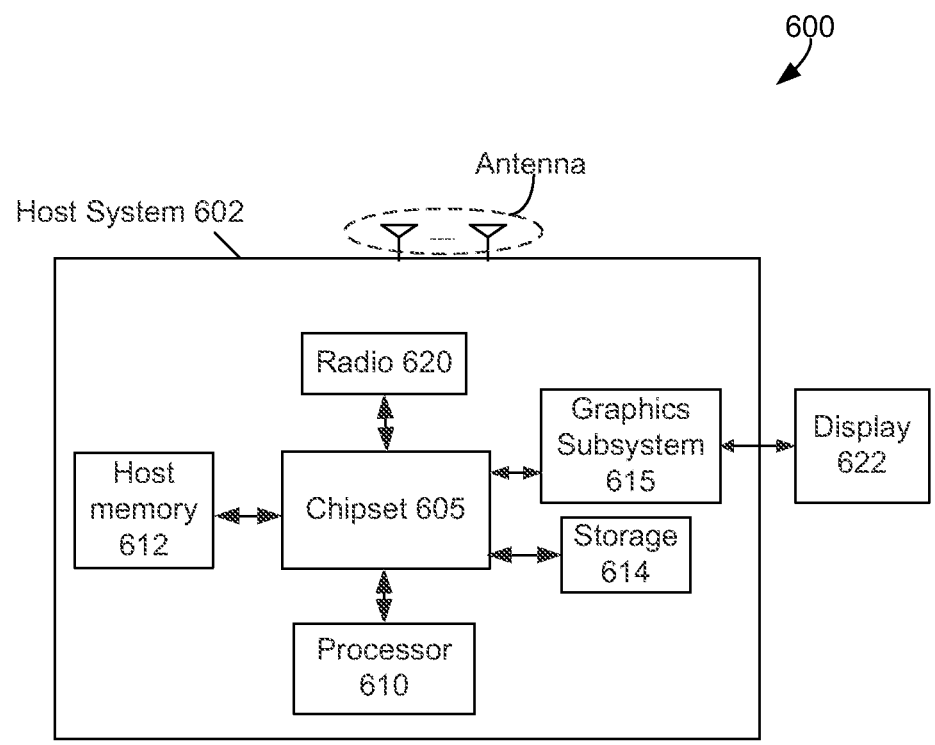
FIG. 7 depicts an example of a mobile station in accordance with an embodiment.

FIG. 7 depicts an example of a mobile station in accordance with an embodiment. Computer system 600 may include host system 602 and display 622. Computer system 600 can be implemented in a handheld personal computer, mobile telephone, set top box, or any computing device. Any type of user interface is available such as a keypad, mouse, and/or touch screen. Host system 602 may include chipset 605, processor 610, host memory 612, storage 614, graphics subsystem 615, and radio 620. Chipset 605 may provide intercommunication among processor 610, host memory 612, storage 614, graphics subsystem 615, and radio 620. For example, chipset 605 may include a storage adapter (not depicted) capable of providing intercommunication with storage 614.

Processor 610 may be implemented as Complex Instruction Set Computer (CISC) or Reduced Instruction Set Computer (RISC) processors, x86 instruction set compatible processors, multi-core, or any other microprocessor or central processing unit. Processor 610 manages use of NAP-MSID and paging MS ID paging identifiers, which can be stored in memory.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. An analog or digital interface may be used to communicatively couple graphics subsystem 615 and display 622. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

Radio 620 may include one or more radios capable of transmitting and receiving signals in accordance with applicable wireless standards such as but not limited to any version of IEEE 802.11 and IEEE 802.16. For example, radio 620 may include at least a physical layer interface and media access controller.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method performed by a computing device, the method comprising:
   receiving a Network Access Provider (NAP) domain identifier
   determining a paging identifier of a mobile station, the paging identifier being either independent of the NAP domain identifier or based on the NAP domain identifier; and
   transmitting one of a NAP domain identifier or a paging identifier to at least one node in a network wherein the transmitting one of a NAP domain identifier or a paging identifier to at least one node in a network do not expose a media access control (MAC) address of the mobile station.

2. The method of claim 1, further comprising:
   transmitting one of a NAP domain identifier or a paging identifier to network;
   receiving a second NAP domain identifier; and
   determining a paging mobile station identifier based on the second NAP domain identifier.

3. The method of claim 1, wherein the determining a paging identifier comprises determining the paging identifier as a function of at least one of the NAP domain identifier, Access Service NetworkID, Paging Controller ID, and serving base station ID.

4. The method of claim 1, further comprising:
   receiving a paging group identifier from a node in a network;
   determining whether the paging group identifier matches a paging group identifier of the mobile station;
   in response to the paging group identifier not matching a current paging group identifier of the mobile station, transmitting the NAP domain identifier to at least one node in the network; and
   receiving a paging mobile station identifier that is valid in a current paging group.

5. The method of claim 1, wherein the receiving a NAP domain identifier takes place in response to one or more of network re-entry from uncontrolled hand over, network re-entry after idle mode, and network re-entry from Deregistration with Content Retention.

6. A method comprising:
   determining a unique Network Access Provider (NAP) domain identifier of a mobile station;
   determining a paging identifier for the mobile station based on the NAP domain identifier;
   determining another NAP domain identifier that is unique in the NAP domain of the mobile station in response to the paging identifier not being unique in a paging domain of the mobile station; and
   transmitting a unique NAP domain identifier to a paging controller.

7. The method of claim 5, wherein the determining a paging identifier for the mobile station based on the NAP domain identifier comprises determining a paging identifier using one or more of: a hash, concatenation operation, and derivation operation that approximately uniformly maps a paging identifier onto a paging identifier space.

8. The method of claim 6, further comprising:
   transmitting an ASN-gateway IP address to the mobile station;
   receiving the ASN-gateway IP address from the mobile station;
   receiving a NAP identifier from the mobile station; and
   based on the received ASN-gateway IP address and NAP identifier, providing context associated with the mobile station to an ASN-gateway associated with a next NAP domain of the mobile station and to a serving base station for the mobile station.

9. The method of claim 8, further comprising:
   identifying a serving ASN-gateway based on the received ASN-gateway IP address and
   causing transferral of the context from the serving ASN-gateway to a next serving ASN-gateway.

10. The method of claim 8, wherein the context includes at least one of:
    security key, service flow parameter, capability parameter, quality of service (QoS) parameter associated with connections established by the mobile station, and a paging mobile station identifier.

11. The method of claim 6, further comprising:
independent of a request from the mobile station, updating the NAP domain identifier for the mobile station.

12. The method of claim 6, wherein transmitting a unique NAP domain identifier to a paging controller comprises transmitting the determined NAP domain identifier that is unique in a current NAP domain of the mobile station.

13. A computer-readable medium comprising instructions stored thereon, which when executed by a computer cause the computer to:
request to store a received Network Access Provider (NAP) domain identifier;
determine a paging identifier of a mobile station, the paging identifier based on the NAP domain identifier;
request to store the paging identifier; and
request to transmit the NAP domain identifier in connection with a communication with at least one node in a network.

14. The computer-readable medium of claim 13, wherein instructions to determine the paging identifier comprise instructions to determine the paging identifier as a function of at least one of the NAP domain identifier, an Access Service NetworkID, a Paging Controller ID, and a serving base station ID.

15. The computer-readable medium of claim 13, further comprising instructions stored thereon, which when executed by a computer cause the computer to:
determine whether a received paging group identifier matches a paging group identifier of the mobile station;
in response to the paging group identifier not matching a current paging group identifier of the mobile station, request to transmit the NAP domain identifier to at least one node in the network; and
receive a paging mobile station identifier that is valid in a current paging group.

16. The computer-readable medium of claim 13, wherein the request to transmit the NAP domain identifier occurs in connection with a periodic check-in with the network or a return to connected mode.

17. A system comprising:
one or more antennae;
a wireless network interface communicatively coupled to the one or more antennae;
a memory; and
a processor communicatively coupled to the wireless network interface and the memory, the processor configured to:
request to store a received Network Access Provider (NAP) domain identifier in the memory,
determine a paging identifier of a mobile station, the paging identifier based on the NAP domain identifier,
request to store the paging identifier in the memory, and
request to transmit the NAP domain identifier in connection with a communication with at least one node in a network.

18. The system of claim 17, wherein the request to transmit the NAP domain identifier occurs in connection with a periodic check-in with the network or a return to connected mode.

19. The system of claim 17, wherein to determine the paging identifier, the processor is to determine the paging identifier as a function of at least one of the NAP domain identifier, an Access Service NetworkID, a Paging Controller ID, and a serving base station ID.

20. The system of claim 17, wherein the processor is also to:
determine whether a received paging group identifier matches a paging group identifier of the mobile station;
in response to the paging group identifier not matching a current paging group identifier of the mobile station, request to transmit the NAP identifier to the network; and
receive a paging mobile station identifier that is valid in a current paging group.

21. A mobile station comprising:
one or more antennae;
at least one memory; and
at least one processor communicatively coupled to the one or more antennae and the at least one memory, the at least one processor configured to:
access a received Network Access Provider (NAP) domain identifier;
determine a paging identifier of the mobile station, the paging identifier being either independent of the NAP domain identifier or based on the NAP domain identifier; and
cause transmission of one of a NAP domain identifier or a paging identifier to at least one node in a network, wherein the transmission of one of a NAP domain identifier or a paging identifier to at least one node in a network do not expose a media access control (MAC) address of the mobile station.

22. The mobile station of claim 21, wherein the at least one processor is also to:
access a received second NAP domain identifier; and
determine a paging mobile station identifier based on the second NAP domain identifier.

23. The mobile station of claim 21, wherein to determine a paging identifier, the at least one processor is to determine the paging identifier as a function of at least one of the NAP domain identifier, Access Service NetworkID, Paging Controller ID, and serving base station ID.

24. The mobile station of claim 21, wherein the at least one processor is also to:
access a received a paging group identifier from a node in a network;
determine whether the paging group identifier matches a paging group identifier of the mobile station;
in response to the paging group identifier not matching a current paging group identifier of the mobile station, cause transmission of the NAP domain identifier to at least one node in the network; and
access a received a paging mobile station identifier that is valid in a current paging group.

* * * * *